United States Patent [19]

Luchtenberg

[11] Patent Number: 5,395,024
[45] Date of Patent: Mar. 7, 1995

[54] SUPPORTING STRUCTURE FOR A ROOF RACK

[75] Inventor: Curt Luchtenberg, Solingen-Wald, Germany

[73] Assignee: Hagus C. Luchtenberg GmbH & Co. KG, Solingen, Germany

[21] Appl. No.: 55,223

[22] Filed: Apr. 28, 1993

[30] Foreign Application Priority Data

May 12, 1992 [DE] Germany .................. 9206357 U

[51] Int. Cl.⁶ .................................................. B60R 9/00
[52] U.S. Cl. .................................. 224/321; 224/309; 224/314
[58] Field of Search ............... 224/321, 322, 309, 314, 224/318, 323, 325, 326, 329, 330, 331, 310

[56] References Cited

U.S. PATENT DOCUMENTS

| | | | |
|---|---|---|---|
| 2,436,228 | 2/1948 | Purchase | 224/314 |
| 3,385,488 | 5/1968 | Bronson | 224/321 |
| 4,752,022 | 6/1988 | Thulin | 224/314 |
| 5,071,050 | 12/1991 | Pudney et al. | 224/321 |
| 5,273,195 | 12/1993 | Cucheran | 224/321 |

FOREIGN PATENT DOCUMENTS 3641745 4/1991 Germany .
3814799 8/1991 Germany .

*Primary Examiner*—Henry J. Recla
*Assistant Examiner*—David J. Walczak
*Attorney, Agent, or Firm*—Spensley Horn Jubas & Lubitz

[57] ABSTRACT

A supporting structure for a roof rack of a vehicle. The structure includes two rails. Each rail has a rod supported for being transversely pivotable at supports arranged at the ends thereof and connected with a roof holding device. Bases are pivotably and nondetachably connected to the ends of the rods. The bases are detachably fastenable to the roof holding device. The transverse supports may have any mutual distance for being adaptable to different roofs and/or roof load dimensions.

5 Claims, 3 Drawing Sheets

U.S. Patent　　Mar. 7, 1995　　Sheet 1 of 3　　5,395,024
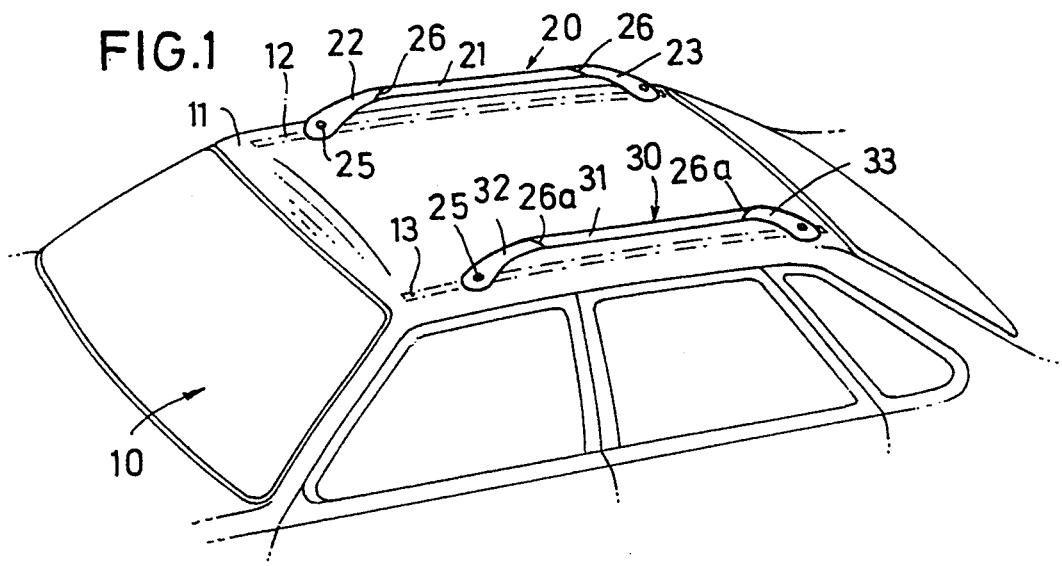
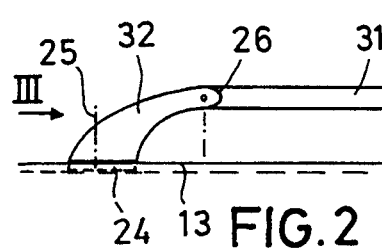 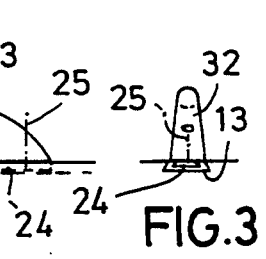
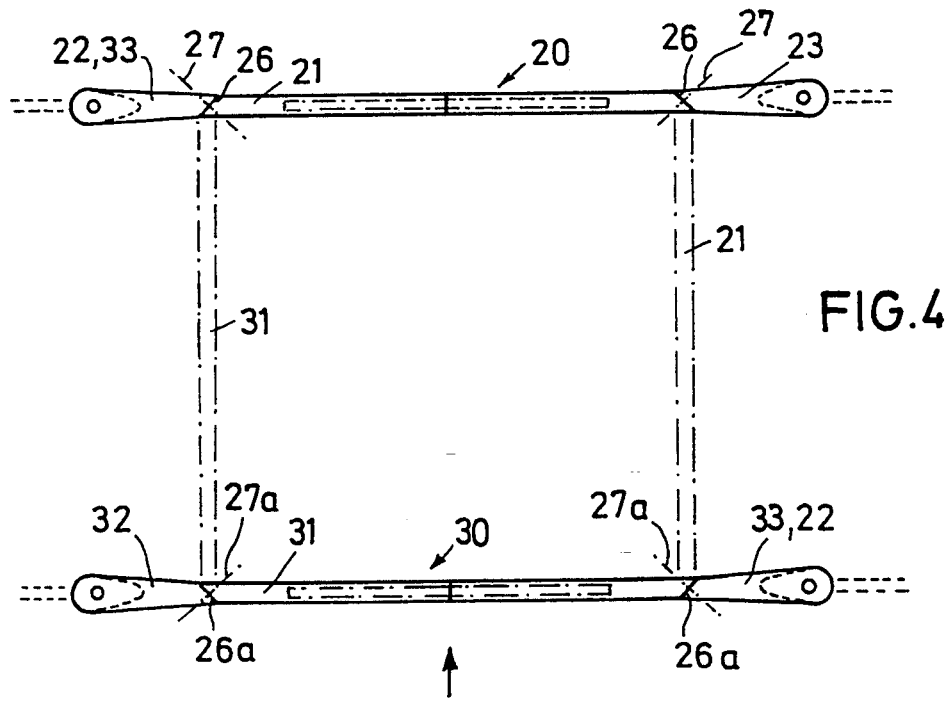

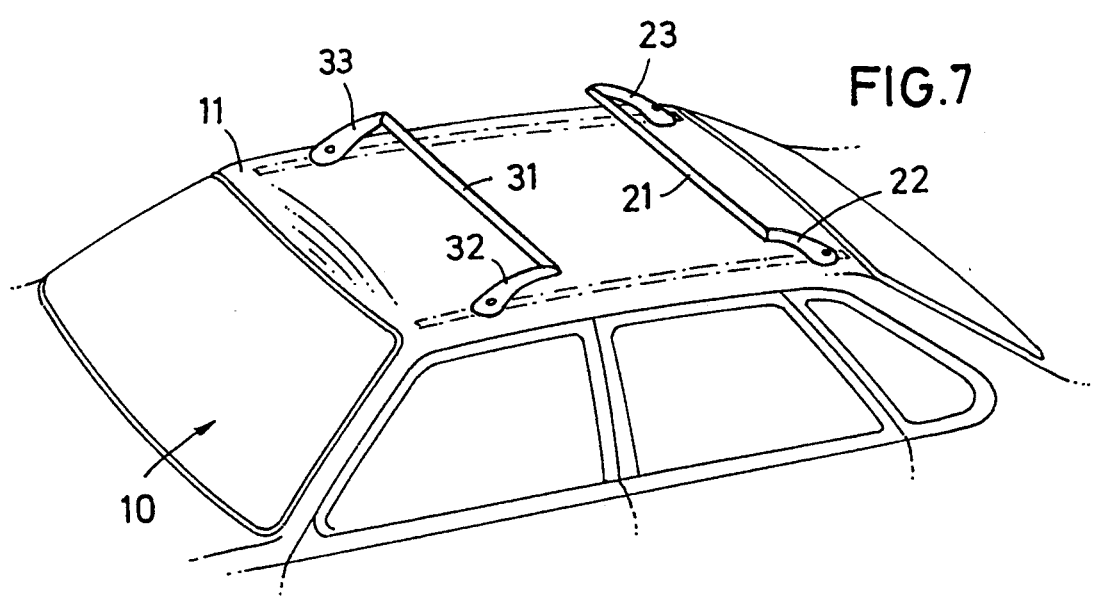

SUPPORTING STRUCTURE FOR A ROOF RACK

BACKGROUND OF THE INVENTION

1. Field of the Invention

The invention relates to a supporting structure for a roof rack for a vehicle, comprising two rails each of which consists of a rod member supported for being transversely pivotable at supports arranged at the ends thereof and being connected with a roof holding device.

2. Description of Related Art

Roof racks are mounted by the user to passenger cars when required. Two rails extending in the direction of motion and arranged adjacent and spaced from each other are provided and form a railing to which transverse supports have to be connected at which the roof loads, e.g. bikes, suitcases or the like are attached. Generally, the assembling of the rails with transverse supports is effected with the aid of screwing elements and pipe clamping members. This is tedious and the reliability of the formed supporting structure depends on the mounting accuracy. In the course of time, screws may loosen and the stability and reliability of the supporting structure decrease. It often seems to be desirable to dismount the transverse supports because they cause wind noise and have unfavourable influence on aerodynamics. This causes additional inconveniences by dismounting work, and moreover, the transverse supports have to be stowed somewhere. If they are stowed in the garage, e.g., they are not present when necessary; the vehicle storing capacity, however, is reduced when they are carried in the vehicle.

In order to overcome this disadvantage, a roof supporting system has been developed (DE 38 14 799 C2), wherein each rail comprises a longitudinally extending trough-like chamber for receiving support rods being supported at the rail and arranged for being pivoted around a vertical axis and which can be swung out to form a transverse support. With its free end, each support rod is secured in the opposite rail; as a consequence, the stationary securing points of the transverse supports invariably determine the distances between two transverse supports so that adaptations to the dimensions of the roof or the roof load are impossible. If they are not used, they are swung back into the trough-like chambers. It is a disadvantage of this configuration that the rail comprising the trough-like chamber must have considerable cross-sectional dimensions so that support rods of sufficient stability can be received therein. The weight of a rail with encased support rods is high, so that such roof supporting systems are only suitable for high-class vehicles and inappropriate for small or middle-class vehicles.

In another known supporting structure (DE 36 41 745 C2), it is provided that the longitudinal rails of two parallel railings are pivotable about vertical axes, so that they can act as transverse supports. After being pivoted, the longitudinal rail is engaged and locked in catch points of the opposite railing with its free end. Again, the stationary securing points determine the mutual distance between two transverse supports and distance variations for adapting the roof rack to different dimensions of the roof or loads to be received are impossible. Further, this roof rack requires high supports for the longitudinal rails in order to offer sufficient free space in case of them being pivoted about the vertical axis to migrate over the transverse crowning of the roof. The height of the supports and the involved elevated arrangement of the roof rack is not only unfavourable in case of loading and unloading, but it may also result in noise formations and changes in the driving qualities of the vehicle.

It is an object of the invention to improve a supporting structure such that the transverse supports may have any mutual distance for being adaptable to different roofs and/or roof load dimensions.

SUMMARY OF THE INVENTION

According to the invention, this object is solved by bases being pivotably and nondetachably connected to the ends of the rod member, which bases are detachably fastenable to the roof holding device.

Owing to this configuration, it is possible that when changing the one rail into a transverse support, only one base remains connected to the first roof holding device and the other base is detached from the first roof holding device, so that it can be entrained and attached to the opposite second roof holding device in case of the rod member being pivoted. Before the base is attached to the second roof holding device, the one base of the other rail is detached therefrom and this one is also changed into a transverse support by pivoting its rod member and attaching the freed base to the first roof holding device. Since the two transverse supports are not mutually dependent, they can be attached with any mutual distances on the vehicle roof. With suitable roof holding devices, they may be variably displaced by the user, so that an adaptation to the roof as well as to the roof loads to be received is possible. The longitudinal rails have entirely changed into the transverse supports and they do not have any specially appertaining remaining parts which could cause a change in the aerodynamics of the vehicle or noise formations. Owing to the nondetachable connection of the bases with the rod member, the safety of the supporting structure is very high, because no sliding of a free rod member end out of a catch connection which may possibly be defective or not properly locked will occur. The user can carefully connect the base with the roof holding device and visually check the connection. Even if the base mounting should loosen, this would not be critical, since, owing to the connection of the rod member and the two bases, the transverse support is stable in itself and reliably performs its supporting function for the roof load.

The supporting structure which exclusively consists of four bases and two rod members, can be manufactured as being light-weighted and very stable, so that the roof is not especially stressed by the supporting structure itself. If the roof rack is not used, the one base of the one rail is released from the first roof holding device and the one base of the other rail is released from the second roof holding device and the rod members pivotably mounted to the fixed base are pivoted back with the coupled free base into the longitudinal rail-forming position and the base is attached. The two longitudinal rails form railings on the roof and neither disturb the driving qualities of the vehicle nor bear a risk to safety.

In a preferred embodiment of the invention, it is provided that the pivotable link connection is an end face link of 45° and that the axes of the end face links of two rails arranged side-by-side converge inwardly. The link axes, which are located in an about horizontal plane in case of elongated rails, extend in an angle under 45° with respect to the longitudinal axis of the rail and meet at an imaginary intersection point between the two rails. The special configuration of the link connections between the two ends of the rod member and the bases causes that the rod member is not only displaced by 90° with respect to the previous longitudinal axis of the rail owing to the pivoting relative to the fixed base, but that, in case of the pivoting, it forms an arch crossing the roof, so that even with roofs having a considerable transverse crowning, bases of low height may be used, because the rod members are not pivoted parallel to the plane of the roof but in an arch thereover. Low bases, in return, improve the outer safety of the vehicle. Moreover, the extension of the end face links permits that the base entrained by the rod member takes a position parallel to the fixed base without being especially adjusted and that it can be fixed to the roof holding device.

With vehicles having flat roofs, the arch-like pivoting movement of the rod member is of minor importance, and, in such case, the link connection of the rod member with the two bases may be a toggle link with a vertical axis.

Advantageously, the roof holding devices are configured as profile rails and it is provided that the bases are configured as cantilevers comprising bottom profiles adapted to the profile rails. This results in a sliding connection between the bases and the profile rails of the roof holding devices, which permits any displacement of the transverse supports relative to each other or of the rails in the longitudinal direction. In order to be able to adapt the length of the transverse supports to the mutual distance between the profile rails, each rod member is preferably telescopic.

BRIEF DESCRIPTION OF THE DRAWINGS

In the drawing, one embodiment of the invention is diagrammatically illustrated by way of example. It shows:

FIG. 1 a perspective view of a roof structure comprising two rails of a supporting system, FIG. 2 a side view of a rail, FIG. 3 a view of the rail in the direction of arrow III in FIG. 2, FIG. 4 a top plan view of the two rails of the arrangement according to FIG. 1, FIG. 5 a perspective view of a rail when being changed to a transverse support, FIG. 6 a diagrammatic illustration of various pivoting positions of one base, and FIG. 7 a perspective view of the roof structure comprising two transverse supports of a supporting structure.

DESCRIPTION OF THE PREFERRED EMBODIMENTS

Figure 5:
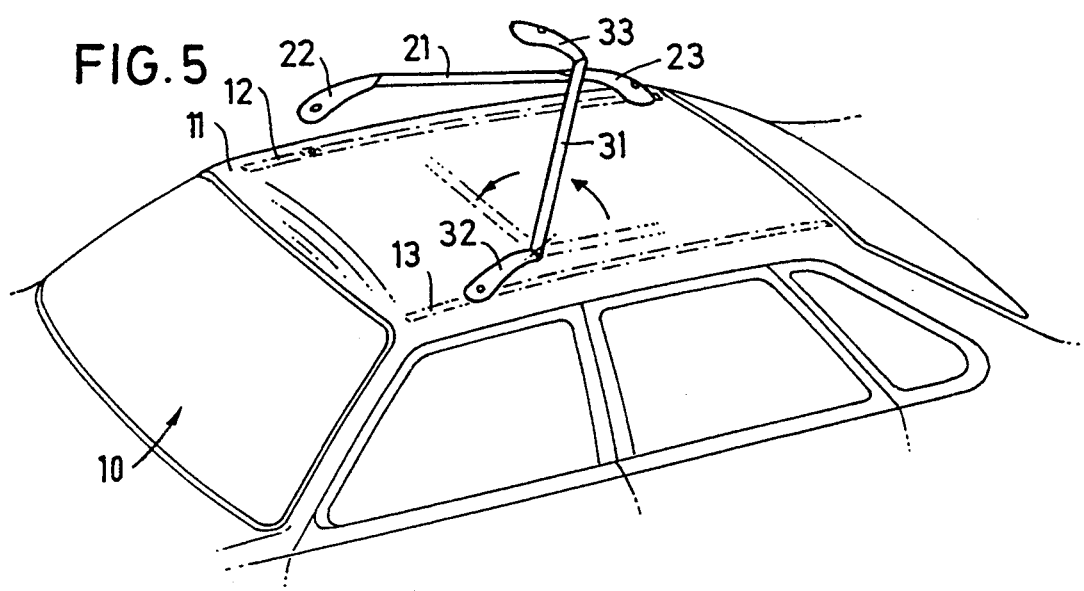
Figure 6:
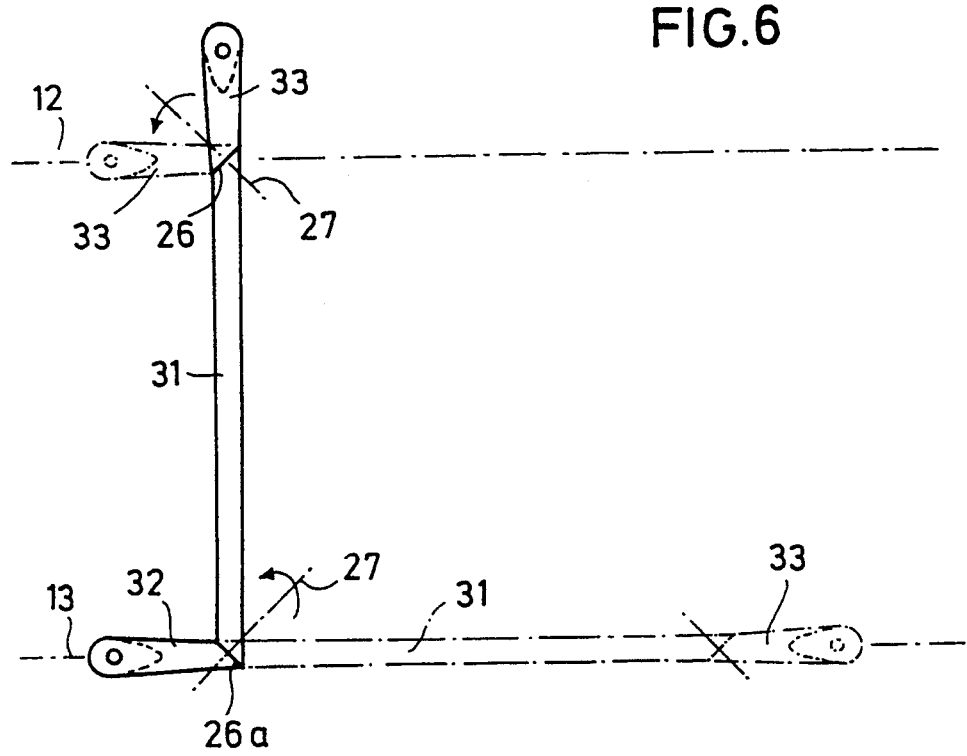

A roof structure 10 of a passenger car on the roof 11 is provided with two longitudinally extending roof holding devices 12,13 arranged at lateral edges, which devices may be applied at factory and be provided with an undercut profile. Each roof holding device 12,13 extends approximately from one end of the roof 11 to the other. While the roof holding device 13 is provided with a rail 30, there is a rail 20 attached in the roof holding device 12. The rail 20 consists of a straight rod member 21 at both ends of which bases 22,23, which are downwardly angled, are pivotably and nondetachably mounted. The rail 30 is composed of a rod member 31 also comprising two pivotably and nondetachably connected and downwardly angled bases 32,33. The bases 22,23 and 32,33, respectively, are configured as cantilevers provided, at their lower ends, with a bottom profile 24 which fits into the profile of the roof holding devices, so that the bases 22,23 and 32,33, respectively, can be longitudinally displaced in the roof holding devices 12,13. The bases 22,23 or 32,33 can be fixed by bolts 25 in the roof holding devices 12,13 (FIGS. 2 and 3).

In the illustrated embodiment, the rod members 21 and 31 are respectively pivotably connected to the two bases 22,23 or 32,33, via an end face link. 26,26a of 45°, respectively. In order to form the end face links 26,26a, the ends of the rod members 21 and 31, respectively, are inclined in an angle under 45° in a manner such that the inclined surfaces extend in a vertical plane. Each base 22,23 or 32,33 is provided at the end facing the rod member 21 or 31 with a corresponding inclined surface, and the matching surfaces are traversed by link axes 27 and 27a, respectively, which pivotably connect the rod members 21 and 31, respectively, to the bases 22,23 and 32,33, respectively, such that each rod member 21 and 31, respectively, can be pivoted by a right angle relative to a fixed base 22 and 23, respectively, by performing a pivoting arch crossing the transverse vault of the roof 11, and that the other base 23 and 33, respectively, can be pivoted relative to the pivoted rod member 21 and 31, respectively. This change of the respective straight rail 20 or 30 into a U-shaped transverse support (FIG. 7) requires that respectively one base—base 22 and base 33 in the described embodiment—is detached from the roof holding device 12 or 13 so that they can change places. The longitudinally extending rails 20,30 as well as the U-shaped transverse supports may be arbitrarily displaced in the roof holding devices 12,13. This permits the rod members 21,31 arbitrarily to approach or depart from each other in the load position of FIG. 7, so that an adaptation to the roof load, e.g. suitcases of different size or the like, is possible.

An adaptation to the width of the respective roof 11 can be achieved by the telescopic configuration of the rod members 21,31. This is indicated in FIG. 4. In this case, a rod member consists of several sections which may be axially adjusted relative to each other.

When mounting the two parallel rails 20,30, it has to be considered that the link axes 27 of the rail 20 and the link axes 27a of the rail 30 converge inwardly, i.e. in the interspace between the two rails 20,30, so that the inclined end face links 26,26a lead the respective rod member 21,31 and the free bases 22,33 into the proper position in which the rod members 21 and 31, respectively, traverse the roof 11, and that the bases 22 and 33, respectively, can be fixed parallel to the fixed bases 23 and 32, respectively, in the roof holding devices 12 and 13, respectively.

I claim:

1. A vehicular roof rack supporting structure for a vehicular roof wherein said roof defining a longitudinal direction and a transverse direction, the vehicular roof rack supporting structure comprising:
   a plurality of roof-holding devices adapted to be positioned on said roof,
   a plurality of bases, at least one of the plurality of bases being detachably fastened to at least one of the plurality of roof holding devices, and
   at least two rods, each of the at least two rods defining opposite ends, each end of each rod having a pivotable and nondetachable connection to one of the plurality of bases respectively, the pivotable and nondetachable connection enabling each of the at least two rods to be supported on said basis for pivotable motion between a first orientation wherein the rod is substantially aligned in the longitudinal direction of the vehicular roof and a second orientation wherein the rod is substantially aligned in the transverse direction of the vehicular roof.

2. The structure of claim 1, wherein the at least two rods comprise a first rod and a second rod, the first and second rods defining a space therebetween, wherein the plurality of bases comprises a first base and a second base, wherein the first rod defines an end that is pivotably and nondetachably connected to the first base by a pivotable link connection comprising an end face link of approximately 45° and defining a first link axis, wherein the second rod defines an end that is pivotably and nondetachably connected to the second base by a pivotable link connection comprising an end face link of approximately 45° and defining a second link axis, and wherein the first link axis and the second link axis converge toward the space between the first and second rods.

3. The structure of claim 1, wherein the end of the rod is pivotably and nondetachably connected to one of the plurality of bases by a pivotable link connection comprising a toggle link having a substantially vertical axis.

4. The structure of claim 1, wherein at least one of the roof holding devices comprises a longitudinally extending member, wherein at least one of the bases comprises a cantilever having a bottom structure, and wherein the longitudinally extending member and the bottom structure are configured for mutual engagement.

5. The structure of claim 1, wherein at least one of the rods comprises a telescopic rod.

* * * * *